INVENTORS
ROBERT D. NELSON
ROYCE E. BIDDICK
BY Stryker & Jacobson
ATTORNEYS

July 28, 1970   R. E. BIDDICK ET AL   3,522,104
BATTERY GASKETS

Filed July 29, 1968   2 Sheets-Sheet 2

INVENTORS
ROBERT D. NELSON
ROYCE E. BIDDICK

BY Stryker & Jacobson

ATTORNEYS

United States Patent Office 3,522,104
Patented July 28, 1970

3,522,104
BATTERY GASKETS
Royce E. Biddick, Edina, and Robert D. Nelson, St. Paul, Minn., assignors to Gould-National Batteries, Inc., St. Paul, Minn., a corporation of Delaware
Filed July 29, 1968, Ser. No. 748,531
Int. Cl. H01m 1/00
U.S. Cl. 136—166                                                             8 Claims

ABSTRACT OF THE DISCLOSURE

A gasket for separating the individual cells of a battery having an electrolyte disengagement chamber, an electrolyte reservoir and a high resistance filling channel.

---

The invention herein was made in the course of, or under a contract or a subcontract thereunder, with the Department of the Navy.

BACKGROUND OF THE INVENTION

Field of the invention

This invention relates generally to gaskets and, more specifically, to separator gaskets for use in a lead-acid pile battery.

Description of the prior art

Lead-acid pile batteries are known in the prior art. These batteries comprise bipolar sheet lead electrodes stacked between U-shaped rubber gaskets. These batteries are generally open at the top and filled with an electrolyte to approximately 90% of the electrode height. The advantage of this type of battery is that it can sustain a very high power output for a few milliseconds; however, the disadvantage is that within 20 milliseconds, 25% of the charge may be withdrawn from the battery. Recent changes in forming the active material of these bipolar sheet electrodes has increased this discharge time from milliseconds to seconds.

With this recent improvement in the bipolar lead electrodes, it has become apparent that these batteries are readily adaptable for use in special equipment requiring high current pulses for brief periods, such as sonar generators and electric arcs. These lead-acid pile batteries must also be maintained in a charged condition to avoid activity loss by sulfation which is a growth of large, inert crystals of lead sulfate. Because sonar systems draw power intermittently, i.e., they are pulsed several time a minute for a period of from one to five seconds, the battery can be maintained in a charged condition by charging the battery in the interim between the pulses.

Thus, a lead-acid pile storage battery or other electrical storage devices employing a lead-acid pile battery is ideally suited from an electrical standpoint to be incorporated into a pulse power. However, because a number of cells must be connected in series to produce the necessary voltage in the bipolar lead-acid battery, the battery structure may be quite bulky.

Also, in the lead-acid pile battery, gas generated from the electrochemical reaction within the battery must be vented from the cell, thus preventing one from hermetically sealing the battery. Obviously, if the battery cannot be sealed it introduces the problem of spillage of the corrosive electrolyte from the cells unless the battery is maintained in a near level condition. Furthermore, because these batteries generally contain a number of cells connected in series to produce the desired voltage output the electrolyte in each cell must be isolated from the electrolyte in the adjacent cell in order to prevent shorting the cells. This necessarily increases the bulkiness of the batteries.

In these prior art lead-acid pile batteries, the electrolyte covers approximately 90% of the plate area because of the tendency of the electrolyte to bubble and boil as the battery is being charged or discharged. However, if the battery is to be used in a submarine where space is at a premium, the battery must be as compact and as efficient as possible. Thus, it is desirable to have the electrolyte covering all the plate area of the bipolar electrode.

Because of the bubbling of the electrolyte it creates both a liquid and a gas on the top of the cell. To avoid loss of battery efficiency, the liquid electrolyte should be returned to the cell while the gas is allowed to discharge from the cell.

We have invented an improved gasket that overcomes the prior art problems involved in making a compact, efficient, vented, and to a certain degree, spillproof battery.

SUMMARY OF THE INVENTION

Briefly, the invention comprises a gasket for separating and containing the individual bipolar plates of a pile battery comprising a substantially planar material having an interior region for receiving a bipolar electrode, an electrolyte, and a separator plate, a second interior region for separating the gas in the electrolyte from the liquid and an electrolyte reservoir having a high resistance channel in fluid communication with the interior region between the electrode and the separator plates. When stacked side by side the gaskets seal the edges of the electrodes and also form electrolyte chambers.

BRIEF DESCRIPTION OF THE DRAWING

Referring to FIG. 1, reference numeral 10 generally designates a lead-acid pile battery comprising a container 11 having a positive lead electrode 12 on one end of the container and a negative lead electrode 13 on the opposite end of the container. The end electrodes can be shaped identically as the bipolar electrodes within the battery but need contain active material only on one face; alternatively, the end electrodes may be of a more rugged design than interior electrodes provided their inner faces are shaped to fit the sealing faces of the gaskets. Connected to lead electrode 12 is a wire 14 and connected to lead electrode 13 is a wire 15. These two wire leads supply power to an external device. Located between electrode 12 and electrode 13 and denoted by reference numeral 17 are the gaskets of our invention.

Referring to FIGS. 2 and 3, reference numeral 20 generally denotes our gasket used to contain individual cells of the lead-acid pile battery. The gasket is formed in a rectangular shape from a substantially planar material such as ethylene-propolyene-terpolymer although any material which is sufficiently rigid, elastic, a nonconductor and is resistant to the corrosive electrolyte could be used. The rectangular shape of the gasket allows the battery to be made compact inside and also produces an external shape that allows it to be packed compactly with other apparatus. Gasket 20 comprises a concave disengagement or separating chamber 21, a concave electrolyte reservoir 22, a high resistance filling channel 23, and an interior region 24 for a separator plate 31 and a bipolar electrode 35 of the lead-acid pile battery. Neither concave chamber 21, concave reservoir 22 or filling channel 23 extend through the gasket but are formed so as to form substantially closed chambers when placed adjacent to a gasket having a flat surface. Located in the interior region of the gasket 24 is a marginal face 30 that is recessed in gasket 20 to support separator plate 31. Separator plate 31 is made from a non-conducting phenolic impregnated paper. However, other materials could also be used in the separator plates and the phenolic impregnated paper is only for illustrative purposes. Located vertically along separator plate 31 are a series or ribs 32 which hold separator plate 31 in a spaced relation from electrode 35 thus providing a region between the separator plate 31 and electrode 35 for the electrolyte. Typical dimensions for the ribs are .018 inch by .024 inch with a distance of .5 inch between centers. These are only typical dimensions of the ribs on the separator plate and are used for illustrative purposes only. A second face 36 which is located outside of marginal face 30 and which is recessed less than marginal face 30 supports bipolar electrode 35.

FIG. 1 shows a number of these gaskets stacked adjacent to one another and containing nested electrodes and separators so as to form a complete battery. Each gasket forms an electrolyte compartment for one cell and seats tightly against opposing faces of adjacent electrodes to prevent electrolyte leakage.

Figures 1, 2, 3:
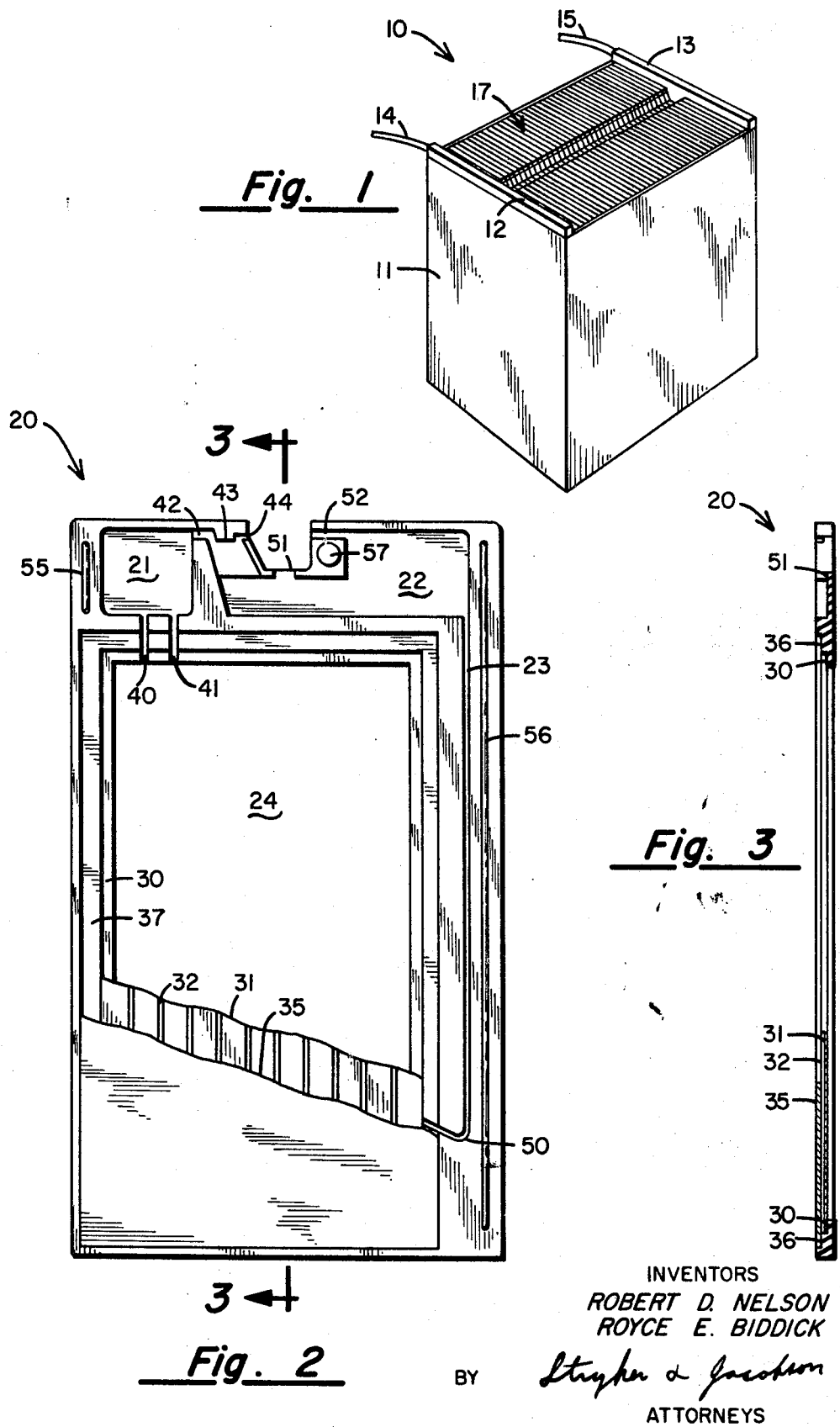
FIG. 1 is a pictorial view showing a lead-acid pile battery containing a number of cells with gaskets stacked side by side to hold the sheet electrodes.
FIG. 2 is a front elevation view showing the preferred embodiment of our gasket.
FIG. 3 is a side view taken along lines 3—3 of FIG. 2.

Prior to using the battery, an operator fills the interior region with electrolyte by pouring electrolyte into electrolyte reservoir 22 through an opening 51. This electrolyte flows to the interior region around the electrode through channel 23. During charge and discharge of the battery, liquid and gas builds up through a first channel 40 and a second channel 41 into disengagement chamber 21. The gas in the disengagement chamber 21 separates and exhausts through opening 42 around protrusion 43 and through a vent hole 44 while the liquid runs into electrode reservoir 22 through opening 42 as well as flowing back through channel 40 and channel 41 to the interior region. Channel 40 and channel 41 are approximately $\frac{1}{16}''$ wide. The reason two channels are provided between the interior region and disengagement chamber 21 rather than a single wide one is with the battery gaskets assembled in a stacked arrangement it is necessary to apply pressure on the gaskets to produce a fluid tight seal around the edges of the electrode on the gasket. Consequently, if the channel was wider the gasket material would tend to bow inward and partially fill the channel thus reducing the effective area for the electrolyte to flow to and from the disengagement chamber 21. Although two are preferred, it is apparent that one channel would also work but it would have to be much larger. Thus, it is advantageous to use two separate channels so little bowing of the gasket occurs and so liquid can flow back through one channel while gas flows out through the other.

Located immediately outside the disengagement chamber 21 are protrusion 43 and venthole 44. The protrusion 43 directs any liquid electrolyte that boils over from disengagement chamber 21 downward into reservoir 22. At the same time the undesired gas can be vented to the outside through venthole 44. In the event gas is trapped in electrolyte reservoir 22 it can exhaust through venthole 52 in gasket 20. The liquid electrolyte in electrolyte reservoir 22 flows into the interior region through channel 23 which has an upwardly curved portion 50. The long channel 23 provides a high resistance path so in the event that a number of cells have a common electrolyte reservoir, there would be only slight current loss because of the high resistance through the narrow channel 23. The upwardly curved portion 50 traps liquid electrolyte and prevents gas from venting through channel 23 instead of disengagement chamber 21.

Opening 51 to the electrolyte reservoir 22 is placed in a central position in gasket 20 because this allows maximum tilting motion of the battery without or causing the electrolyte to run out from the cell. Also opening 51 is recessed below the top of the gasket so that when a number of gaskets are stacked side by side, they form a common filling trough for the electrolyte to flow into openings such as opening 51.

Because a number of these gaskets are stacked side by side to form a multicell lead-acid pile battery, there must be provided means for matching the gaskets so as to produce proper alignment. Thus, on front of gasket 20 there is provided a tongue 55, a tongue 56 and a tongue 57. Located on the back side of the gasket 20 and directly opposite to tongues 55, 56 and 57 are three grooves that the three tongues 55, 56 and 57 fit snugly in, thus providing proper alignment and preventing rotation or movement of the gaskets among one another. While the gasket has been described with respect to a lead-acid pile battery, it is apparent that it could be used with other batteries other than the lead-acid type. Also the gasket can be used with batteries that are not pulsed.

Figure 4:
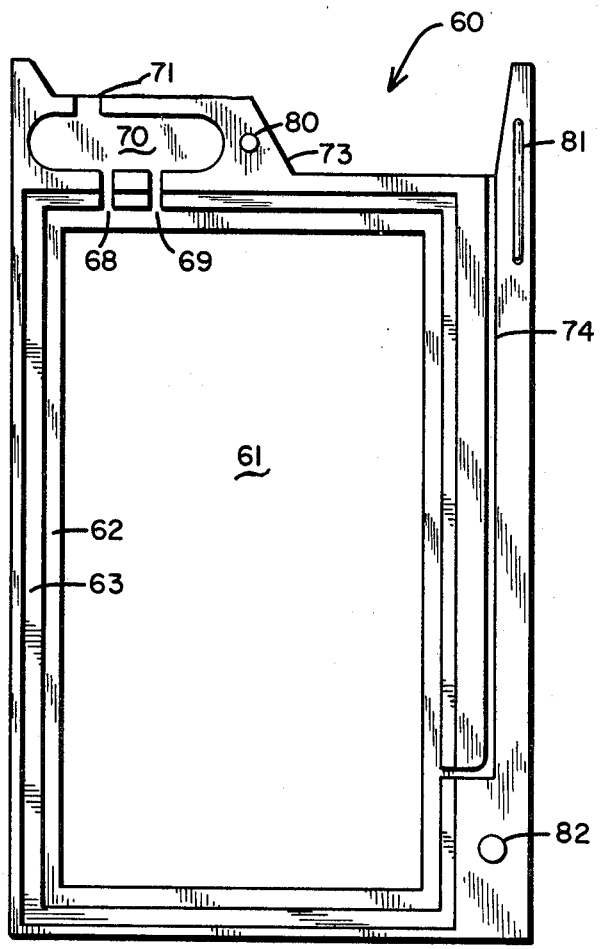
FIG. 4 is an alternate front elevational view of an alternate embodiment of our gasket.

Referring to FIG. 4, reference numeral 60 designates an alternate embodiment of a gasket for a lead-acid pile battery. Gasket 60 comprises an interior region 61 having a recessed marginal face 62 for receiving a separator plate and a face 63 which is recessed only slightly for receiving an electrode of a lead-acid pile battery. Connected to the interior region 61 to a disengagement chamber 70 are a first channel 68 and a second channel 69. These channels allow the bubbling electrolyte and liquid to pass into a disengagement chamber 70 and let liquid return to the cell. Any liquid which is forced out through the gas vent 71 runs over into a common electrolyte reservoir 73. This common electrolyte reservoir 73 is obviously not the most desirable type of arrangement for a multicell battery because there is a certain amount of current loss from cell to cell through the electrolyte. In order to prevent the current loss from becoming excessive, a long filling channel 74 which provides a high electrolyte resistance connects electrolyte reservoir 73 to the space between the separator plates and the electrode.

This gasket 60 while not being as efficient and spillproof as gasket 20 does provide a gas disengagement chamber, an electrolyte reservoir, and a high resistance passage so that the lead-acid pile battery can be constructed for certain limited applications. Similarly, gasket 60 contains a tongue 80, a tongue 81, and a tongue 82 that fit into recessed grooves located on the back side of an adjacent gasket.

We claim:

1. A gasket for use in a battery comprising: a substantially planar material having an interior region for receiving a separator plate, an electrode and an electrolyte; a first reservoir located within said planar material for receiving excess electrolyte in the form of a gas and a liquid; a first channel located in said material providing fluid communication between said interior region and said first reservoir; a second reservoir located in said material; and a second channel located in said material providing a high resistance channel between said second reservoir and said interior region.

2. The gasket of claim 1 wherein a third channel located in said planar material provides fluid communication between said first reservoir and said second reservoir so that excess liquid electrolyte flows into said second reservoir.

3. The gasket of claim 2 wherein said material includes a venthole for discharging the gas generated by charge and discharge of said battery.

4. The gasket of claim 1 including means for matching and aligning said gasket with a similarly disposed gasket member.

5. The gasket of claim 1 wherein said high resistance channel extends along the gasket and curves upwardly into the interior region of said gasket so as to prevent gas from passing through said high resistance channel.

6. The gasket of claim 1 wherein said material contains a channel having a protrusion therein connecting said first reservoir to said second reservoir thereby forcing said electrolyte to flow into said reservoir.

7. The gasket of claim 1 wherein said material includes an opening for supplying an electrolyte to said gasket.

8. The gasket of claim 7 wherein said opening is centrally located with respect to said gasket so as to minimize spillage of the electrolyte if the battery is tipped from side to side.

References Cited

UNITED STATES PATENTS

| | | | |
|---|---|---|---|
| 3,278,336 | 10/1966 | Uline et al. | 136—86 |
| 3,359,136 | 12/1967 | Merten et al. | 136—6 XR |
| 3,441,447 | 4/1969 | Hartop | 136—166 |

WINSTON A. DOUGLAS, Primary Examiner

D. L. WALTON, Assistant Examiner

U.S. Cl. X.R.

136—177